Oct. 2, 1962  C. W. MUSSER  3,056,311
ROTARY-LINEAR TRANSDUCERS
Filed Nov. 2, 1961  2 Sheets-Sheet 1
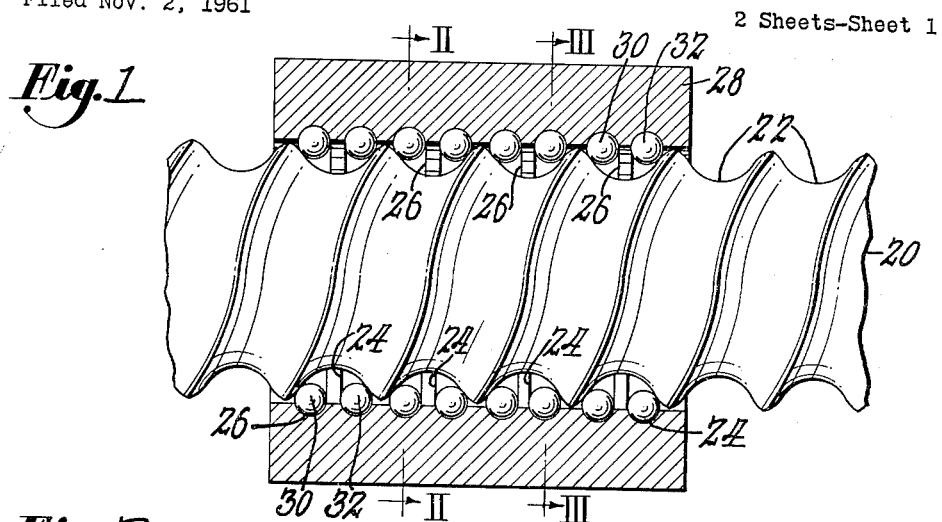
*Fig. 1*
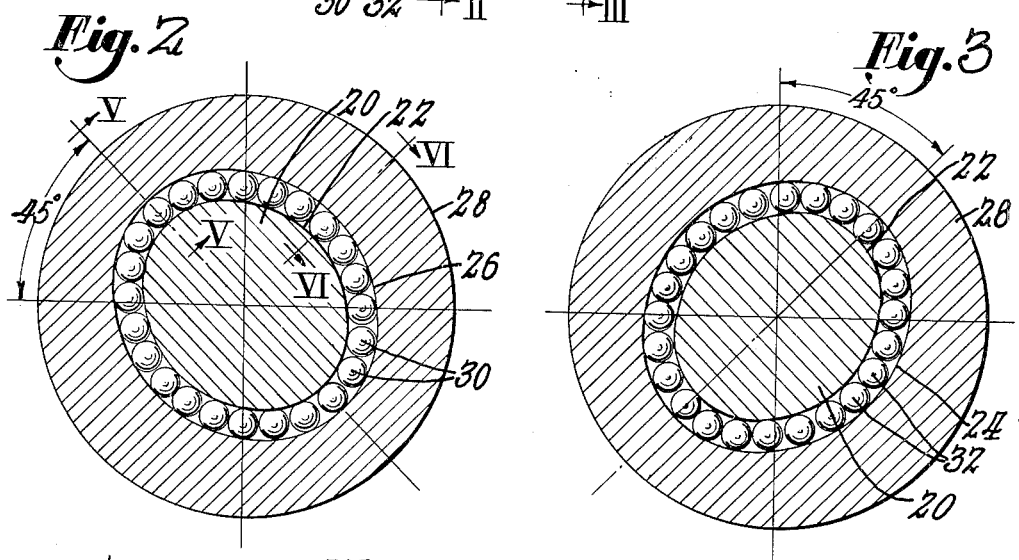
*Fig. 2*  *Fig. 3*
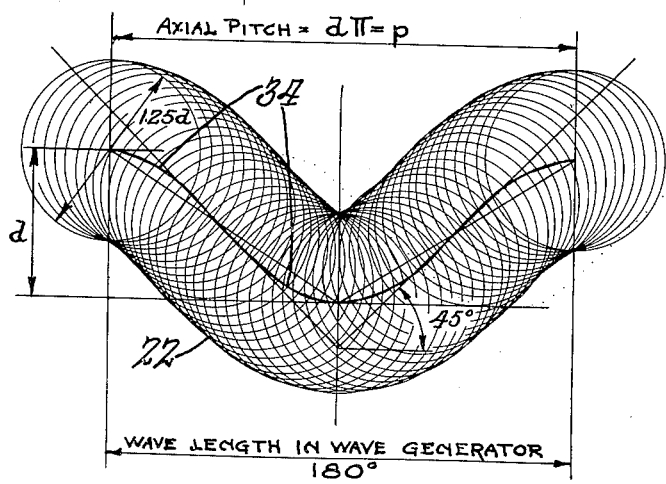
*Fig. 4*
Inventor
C. Walton Musser
By his Attorney
Carl E. Johnson.

Oct. 2, 1962 C. W. MUSSER 3,056,311
ROTARY-LINEAR TRANSDUCERS
Filed Nov. 2, 1961 2 Sheets-Sheet 2

$r_1 = r \pm \dfrac{d}{2} \cos 2\theta$

United States Patent Office 3,056,311
Patented Oct. 2, 1962

3,056,311
ROTARY-LINEAR TRANSDUCERS
C. Walton Musser, Beverly, Mass., assignor to United Shoe Machinery Corporation, Boston, Mass., a corporation of New Jersey
Filed Nov. 2, 1961, Ser. No. 149,542
4 Claims. (Cl. 74—424.8)

This invention relates to mechanism for efficiently converting rotary to linear movement and vice-versa. More specifically, the invention pertains to a transducer assembly of the general type sometimes referred to as a ball bearing screw.

In the usual ball bearing screw arrangement relative motion of parts is obtained with rolling contact between them instead of sliding contact thus providing easier operation. Customarily such construction has comprised a plurality of rolling elements or balls in helical grooves formed in a nut and in matching helical grooves on a cooperating screw member within the nut. For recirculating the rolling elements from one end of their helical travel to the starting points of their movement between the nut and the screw member, one or more tubular guides across the outside of the nut has normally been required. Although the transducer of this invention superficially appears similar to prior constructions in that it includes a screw member and a nut cooperating therewith through rolling elements, the assemblage of this invention is clearly distinguished both in the manner of cooperation of its parts, and in their number and configuration.

Thus, for instance, as herein shown in contrast, the rolling elements do not individually fit the groove convolutions of the screw, but remain in one raceway in the nut; recirculating guides are not needed; the raceways in the nut do not have a helix angle; and a plurality of rolling element raceways in the nut cooperate with a single thread in the screw.

A primary object of my invention is to provide improved means of the ball bearing screw type for converting rotary to linear movement or linear to rotary movement, in which friction between the parts is further reduced and efficiency increased. Further objects are to provide a device of the type referred to wherein no additional means is required for recirculating the rolling elements, a relatively high axial travel of an output member per revolution of the nut is obtainable, and the nut may in comparison with prior construction, have a relatively smaller over-all diameter with respect to that of a screw.

In accordance with these objects, a feature of the invention resides in the provision of transducer mechanism comprising a screw lobar in cross section and having at least one thread of selected pitch, a relatively rotatable nut in telescoping relation on the screw, the nut having a plurality of raceways correspondingly lobar but of zero pitch, and a plurality of roller elements in each raceway, the amplitude of the raceway corresponding to that of the screw to maintain the elements in contact with both the nut and the thread during relative movement. As herein illustrated, the screw (sometimes termed a wave generator) and the raceways are elliptoidal in cross section but it is to be understood that they may have a transverse configuration providing more than two lobes respectively and accordingly the term "lobar" is employed with respect to the screw and raceway to comprehend all of such shapes. Indeed, a device could come within the scope of the invention if the raceways of the nut were circular but eccentric to each other. The basic principle to be noted, however, is that as the screw and nut are relatively rotated, the rolling elements in the raceways are caused to have a component of movement radially inwardly or outwardly.

The above and other features of the invention, including details of construction, will now be more particularly described in connection with an illustrative embodiment, and with reference to the accompanying drawings thereof, in which:

FIG. 1 is an axial section showing a transducer comprising an elliptoidal screw, a nut, and intermediate rolling elements;

FIG. 2 is a slightly diagrammatic section taken on the line II—II of FIG. 1;

FIG. 3 is a similar section taken on the line III—III of FIG. 1 and, when considered with FIG. 2, illustrates phase relationship of adjacent raceways;

FIG. 4 is a view indicating how one form of the tooth or thread of the screw is developed;

Figure 5:
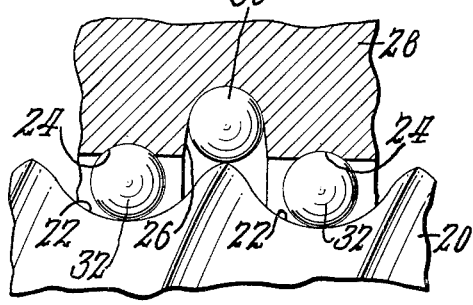
FIG. 5 is a section taken on the line V—V of FIG. 2, and illustrating the relation of the rolling elements with the screw at the larger axis of one raceway or groove and at the minor axis of the adjacent raceways or grooves.

Referring to FIGS. 1 to 3, a lobar screw 20, elliptoidal in cross section, is formed with multiple threads 22 (FIG. 1), in this case two, for cooperating with corresponding axially spaced, elliptoidal sets of raceways 24, 26 formed internally of a nut 28. It will be understood that if, for instance, the screw were provided with a triple lead, each of the nut raceways or grooves 24, 26 would be formed with a 3-wave or tri-lobar shape instead of being elliptoidal. Each thread 22 as illustrated in FIG. 1 has a plurality of rolling elements such as balls 30, 32 in contact therewith. These balls are preferably all alike as to size. While the thread 22 has suitable pitch, the raceways 24, 26 have no pitch but are, as shown in FIGS. 2 and 3, 90° out of phase with each other.

In FIG. 1 four similar sets of raceways 24, 26 are illustrated, each set comprising grooves spaced one-half pitch apart; i.e. they maintain the centers of the balls 30, 32 spaced apart axially by a distance equal to one-half the distance between adjacent peaks of the screw threads. The relationship of the adjacent raceways 24, 26, as seen from a comparison of FIGS. 2 and 3, further is that they constitute elliptoids which are 90° out of phase with each other about the axis of rotation of the assembly. Hence, all of the rolling elements 30, 32 are radially movable during operation of the assembly and those shown in FIG. 1 are midway of their radial displacement. The arrangement is such that, if the nut 28 is rotated relatively to the screw 20, all of the balls shown in FIG. 1 would be moving radially, half of them being moved outwardly and half of them inwardly. Consequently the inwardly moving balls would act on the threads 22 to cam the screw axially. Incidentally, it will be recognized that FIGS. 2 and 3 are not strictly true sections in that, in fact, the balls 30, 32 are not in contact with the screw 20 as shown except at the peaks and valleys of the threads.

FIG. 4 illustrates a development of a thread 22. Its contour is that of a sine wave modified as required in order to accommodate the spherical elements 30, 32. Various diameters for these elements may be used, and also different pitch can be selected for a given transducer constructed in accordance with this invention. For the conditions illustrated in FIG. 4 a sine wave form having a peak-to-peak magnitude designated $d$ is shown, the pitch and the roller diameter likewise being indicated in terms of $d$. The axial pitch was selected to provide the maximum angle for the sine wave of 45°, thus yielding a pressure angle on the screw 20 which will be about 45°. This is to say that, for these conditions, the balls will be functioning against the wall of the thread 22 at this angle. The path of the centers of each of the balls 30, 32 is shown as a sine wave 34 (FIG. 4) having a peak-to-peak amplitude $d$, and a maximum slope of 45°, the axial pitch $p$ then equaling the dimension $\pi$ times $d$. Travel of the ball centers along the wave 34 generates a wave shape which is the contour of the threads 22.

Figure 8:
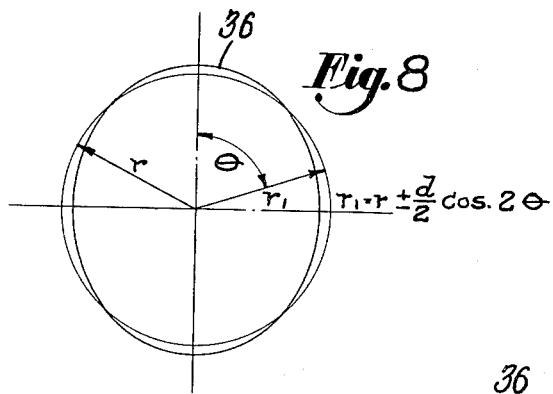
FIG. 8 is a diagrammatic view of the elliptoidal shape of a raceway together with the mathematical expression therefor.
Figure 9:
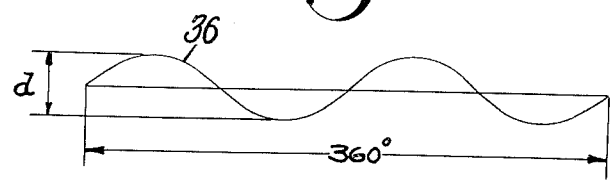
FIG. 9 is a development of the raceway amplitude depicted in FIG. 8.

As shown herein the axial pitch $p$ is the axial distance from one thread to the next thread of the screw 20. The wave form 34, therefore, in addition to representing the path of the centers of the rolling elements in FIG. 4, also represents the sine wave of the elliptoidal raceways 24, 26 in the nut 28 with which the balls 30, 32 must always be in contact. The sine wave 34, when referred to the elliptoidal screw 20, is accordingly a wave length for one-half revolution of the screw. This is illustrated in FIGS. 8 and 9 wherein the axial sine wave 34 is designated 36 in the elliptoidal configuration. The sine wave 36 should have the same peak-to-peak amplitude $d$ as the sine wave 34 to maintain all the balls 30, 32 in continual contact with the thread 22 and the raceways 24, 26 through their entire surfaces.

Figure 6:
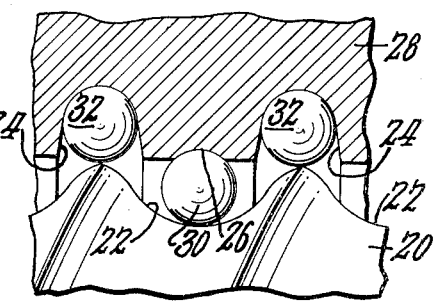
FIG. 6 is a section taken on the line VI—VI of FIG. 2 and illustrating the relationship of the rolling elements of the screw at a position 90° from that shown in FIG. 5.

FIG. 5 illustrates the relationship of the rolling elements 30, 32 with the thread 22 at that location wherein an element 30 is at the major axis of the raceway 26, and at either side an element 32 is at the minor axis of their respective raceways 24. These elements, in these extreme positions of their radial movement, cannot be useful in generating axial motion of the screw 20 since they cannot serve as cams while at the peak and the valley of the wave. Of the other roller elements otherwise situated in the respective raceways 24, 26 one-half are moving radially inward to contribute to producing relative axial motion in one direction, and the other half are rolling outwardly on the slope on the opposite side of the thread and thus tending to prevent overtravel of the screw. Those balls 30, 32 at the cross-over point of the wave which are on the 45° slope contribute most to the conversion from rotary to linear movement. FIG. 6 shows the relationship of the roller elements and the screw thread at the location wherein an element 30 is on the minor axis of the raceway 26 and adjacent elements 32 are now at the major axis of the respective raceways 24.

Figure 7:
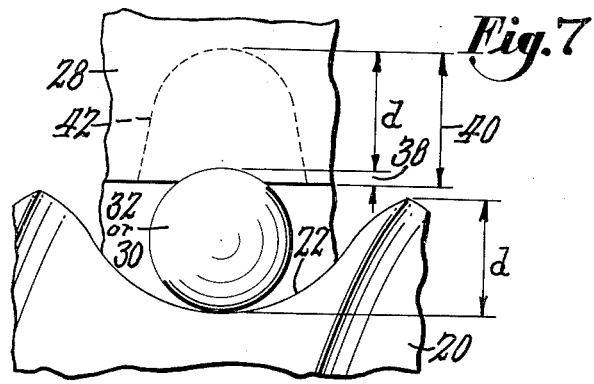
FIG. 7 is a diagrammatic view showing a preferred dimensional relationship of the parts with reference to peak-to-peak amplitude.

FIG. 7 shows diagrammatically a preferred dimensional relationship of the parts, the diameter of the balls being somewhat greater than the height $d$ of the sine wave. Protrusion of the roller element from the thread 22 should always occur to some extent so that the element can be engaged by the nut 28. It is also necessary for the latter to have clearance with the screw 20. Thus the minimum depth of a nut raceway may be as shown at 38 (FIG. 7) and its maximum depth may be as indicated at 40, the maximum depth groove being illustrated by the dotted line 42. The difference in the maximum and minimum raceway depths is of course equal to the sine wave height $d$.

It will be apparent that the number of sets of raceway grooves for a given nut 28 may be selected according to the desired load-carrying capacity. While the adjacent grooves have herein been shown 90° out of phase about the axis of rotation, it will be understood that this is not mandatory so long as their actual spacing is appropriately selected to accord with the specific phase relationship. As shown the raceways 24, 26 are separated by one-half pitch and the elliptoids are separated by 90°. If a different pitch were selected so that it would not crowd the raceways, they could be separated differently. For instance, the raceways could be separated one-third pitch and the elliptoids would then be out of phase by 60° instead of 90°. It will further be apparent that no specific or strictly sine wave shape need be used for the screw thread or the nut raceways.

As above indicated a simple transducer of the general type described, but not herein shown, could be provided by a screw having a single lead thread. Circular raceways in the nut would then be utilized, the cooperating nut raceways being eccentric. If in this case the raceways were placed one-half pitch apart axially, their eccentricity would be 180° out of phase. Operation of this device would be similar to that previously described. The circular nut raceway eccentric to the axis of the screw would, upon rotation, produce the illustrated sine wave and it would have a peak-to-peak amplitude dependent on the degree of eccentricity.

While the balls 30, 32 have been herein shown in contact with each other, it will be appreciated that any suitable separators may be employed if desired.

Having thus described my invention, what I claim as new and desire to secure by Letters Patent of the United States is:

1. A transducer comprising a transversely lobar screw having at least one thread of selected pitch, a relatively rotatable nut in telescoping relation on the screw, the nut having a plurality of raceways correspondingly lobar in cross section but of zero pitch, and a plurality of roller elements in each raceway, the peak-to-peak amplitude of the raceways corresponding to that of the thread to maintain said elements in contact with both the nut and the screw during their relative movement.

2. A transducer according to claim 1 and further characterized in that the screw is formed with a pair of external threads having the axial shape of a sine wave, the raceways of the nut are elliptoidal in configuration, one pair of raceways cooperating with each thread and being out of phase with each other, and the roller elements are balls of a diameter greater than the depth of said wave.

3. A transducer according to claim 1 wherein the balls in the several raceways are of the same diameter and adjacent raceways of the nut are 90° out of phase.

4. A transducer comprising a screw of elliptoidal cross section and having a pair of threads of selected pitch, a relatively rotatable nut in telescoping relation on the screw, the nut having a plurality of pairs of elliptoidal raceways of zero pitch, the raceways of each pair being spaced one-half pitch apart for cooperating with one of said threads and the axial pitch of each thread being equal to $\pi$ times the peak-to-peak amplitude of the raceways, and a plurality of roller elements in the latter having a diameter, respectively, at least as great as said amplitude.

References Cited in the file of this patent

UNITED STATES PATENTS

| | | |
|---|---|---|
| 2,616,302 | Wahlmark | Nov. 4, 1952 |
| 2,739,491 | Russell | Mar. 27, 1956 |
| 2,924,113 | Orner | Feb. 9, 1960 |

FOREIGN PATENTS

| | | |
|---|---|---|
| 348,847 | Germany | Feb. 17, 1922 |